(12) United States Patent
Weiner

(10) Patent No.: US 6,298,599 B1
(45) Date of Patent: Oct. 9, 2001

(54) VASE AND BASE IN THE SHAPE OF A SCULPTURED HEAD AND TORSO

(76) Inventor: Roberta Weiner, Borgo Al Molino 10, 50010 Troghi (IT)

( * ) Notice: Subject to any disclaimer, the term of this patent is extended or adjusted under 35 U.S.C. 154(b) by 0 days.

(21) Appl. No.: 09/538,809

(22) Filed: Mar. 30, 2000

(51) Int. Cl.[7] .................................................. A01G 9/00
(52) U.S. Cl. .................................................. 47/65.5; 47/71
(58) Field of Search .................... 47/65.5, 66.1, 47/66.6, 39, 71

(56) References Cited

U.S. PATENT DOCUMENTS

| | | | |
|---|---|---|---|
| 4,196,542 | * 4/1980 | West . | |
| 4,795,398 | * 1/1989 | Wexler | 446/327 |
| 4,914,860 | * 4/1990 | Richardson | 47/72 |
| 5,194,030 | * 3/1993 | LeBoeuf et al. | 446/72 |
| 5,239,774 | * 8/1993 | Richabaugh | 47/77 |
| 5,395,244 | * 3/1995 | ONiell | 434/131 |
| 5,549,500 | * 8/1996 | Manoah | 446/385 |
| 5,850,940 | * 12/1998 | Slaon et al. | 222/78 |
| 6,202,349 | * 3/2001 | Kanagawa et al. | 47/83 |

FOREIGN PATENT DOCUMENTS

| | | |
|---|---|---|
| 3634958-A1 | * 4/1988 | (DE) . |
| 2093408-A | * 9/1982 | (GB) . |
| 10-75664 | * 3/1998 | (JP) . |
| 11-141191 | * 5/1999 | (JP) . |

* cited by examiner

Primary Examiner—Charles T. Jordan
Assistant Examiner—Jeffrey L. Gellner
(74) Attorney, Agent, or Firm—Ezra Sutton

(57) ABSTRACT

A three-dimensional, decorative sculptured-plant vase having the appearance of a sculptured head and a sculptured torso for receiving in the sculptured head a plant with leaves, wherein the plant leaves appear to be the hair of the sculptured head. The decorative sculptured-plant vase includes a head-vase section having a curved outer wall with a circular perimeter rim edge for forming a plant-receiving opening, a plant interior chamber and a bottom wall having a stabilizing plug member extending therefrom; the plug member having at least one drainage hole opening formed therein; the plant interior chamber for receiving potting soil and a plant(s) therein; and a torso-base section having a curved upper wall with a circular perimeter rim edge for forming a plug-receiving opening, and a curved lower wall having a substantially curved perimeter rim edge for forming a bottom base opening and a torso inner chamber. The stabilizing plug member of the head-vase section is received within the plug-receiving opening of the torso-base section, wherein the head-vase section is above and detachably connected to the torso-base section.

8 Claims, 4 Drawing Sheets

VASE AND BASE IN THE SHAPE OF A SCULPTURED HEAD AND TORSO

FIELD OF THE INVENTION

This invention relates to a three-dimensional, decorative sculptured-plant vase. More particularly, the vase includes a sculptured head section for holding a plant and a sculptured torso section beneath it for enclosing a water collection tray. Additionally, a connection plug and a water drainage hole(s) are provided in the sculptured head section to aid in drainage of excess water from the plant, such that the water drains into the water collection tray enclosed within the sculptured torso section.

BACKGROUND OF THE INVENTION

Flower vases, plant pots, flower pots, hanging plant pots, and the like having a pot/vase portion for housing the plant and/or flowers and a water collection tray under the pot for collecting excess water are well known in the prior art. Additionally, vases and plantpots having decorative and aesthetic ornamentation, such as leaves, trees and pictorial views are also well known in the prior art.

There remains a need for a plant vase being a three-dimensional, decorative sculptured-plant vase with head and torso sections connected together by water drainage and collection means. The head-vase section would hold a plant or flowers, and the torso-base section beneath the head-vase section would enclose a water collection tray to aid in the drainage of excess water from the plant, where the excess water drains into the water collection tray enclosed inside the torso-base section.

DESCRIPTION OF THE PRIOR ART

Flower vases, flower pots, plant pots and hanging plant pots of various designs, configurations, structures and materials of construction have been disclosed in the prior art. For example, U.S. Pat. No. 3,981,099 to Dziewulski discloses a hanging flower pot with a detachable tray beneath it. Drain holes are provided at the bottom of the tray. The advantage of this prior art invention is that the tray stays attached when the flower pot is suspended by means of a hook.

U.S. Pat. No. 4,043,077 to Stonehocker discloses an expandable pot for containing plants and their roots. Drain holes and evaporation holes are provided, as well as a drain container for excess water flow. The flexible sides of the pot will expand like an accordion as the plant and roots grow. This prior art patent shows various shaped embodiments of the expandable pot. This patent also states that although aesthetic leaves have been shown, other plant or flower shapes may be used for ornamentation.

U.S. Pat. No. 4,280,635 to Murphy shows a vase cover for a potted plant to be inserted into the base. A bottom container catches and holds water so that the floor beneath the pot does not get damaged.

U.S. Pat. No. 4,442,629 issued to Anderson also discloses a combination flower pot and tray. The tray includes a lug that is located at the center of the tray adapted to snap fit into an opening in the bottom of the pot. Drain holes are also provided in the bottom wall of the pot to aid in drainage of excess water.

None of the prior art patents teach or disclose a plant or flower vase, or a plant or flower pot having a sculptured head section and a sculptured torso section connected by water drainage and collection means.

Accordingly, it is an object of the present invention to provide a decorative sculptured-plant vase that includes a sculptured head-vase section for holding a plant and/or flowers and having a drainage channel therein, and a sculptured torso-base section beneath the sculptured head-vase section for receiving a water collection tray in order to collect drainage water from the drainage channel.

Another object of the present invention is to provide a decorative sculptured-plant vase having a sculptured head section selected from the group consisting of a human such as a man, a woman or a child; an animal such as a lion, a bird, a wolf, or a cat; and a mythical creature such as a unicorn, a gargoyle, a satyr, a flying dragon, an angel, a werewolf, centaur, or a minotaur.

Another object of the present invention is to provide a decorative sculptured-plant vase having a sculptured torso section selected from the group consisting of a human such as a man, a woman or a child; an animal such as a lion, a bird, a wolf, or a cat; and a mythical creature such as a unicorn, a gargoyle, a satyr, a flying dragon, an angel, a werewolf, a centaur, or a minotaur.

Another object of the present invention is to provide a decorative sculptured-plant vase where the leaves of the plant and/or flowers in the sculptured head-vase section appear to be the hair of the sculptured head.

Another object of the present invention is to provide a decorative sculptured-plant vase that is made from materials selected from the group consisting of terracotta, clay, ceramic, wood, wood products, plastic or light-weight metal.

Another object of the present invention is to provide a decorative sculptured-plant vase wherein the sculptured head-vase section and the sculptured torso-base section are manufactured in a molding operation.

A further object of the present invention is to provide a decorative sculptured-plant vase that can be mass produced in an automated and economical manner and is readily affordable to the consumer.

SUMMARY OF THE INVENTION

In accordance with the present invention, there is provided a three-dimensional, decorative sculptured-plant vase having the appearance of a sculptured head and a sculptured torso for receiving in the sculptured head a plant with leaves, wherein the plant leaves appear to be the hair of the sculptured head. The decorative sculptured-plant vase includes a head-vase section having a curved outer wall with a circular perimeter rim edge for forming a plant-receiving opening, a plant interior chamber and a bottom wall having a stabilizing plug member extending therefrom; the plug member having at least one drainage hole opening formed therein; the plant interior chamber for receiving potting soil and a plant(s) therein; and a torso-base section having a curved upper wall with a circular perimeter rim edge for forming a plug-receiving opening, and a curved lower wall having a substantially curved perimeter rim edge for forming a bottom base opening and a torso inner chamber. The stabilizing plug member of the head-vase section is received within the plug-receiving opening of the torso-base section, wherein the head-vase section is above and detachably connected to the torso-base section. The curved outer wall of the head-vase section includes facial features thereon to have the appearance of a three-dimensional sculptured head for receiving a plant with plant leaves in the plant interior chamber of the sculptured head, wherein the plant leaves appear to be the hair of the sculptured head. The curved lower wall of the torso-base section includes anatomical features thereon to have the appearance of a three-dimensional sculptured torso. The decorative sculptured-plant vase also includes a water collection tray for receiving excess water drained from the drainage hole opening, wherein the water collection tray is enclosed within the torso inner chamber to render it non-viewable.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein.

DETAILED DESCRIPTION OF THE PREFERRED EMBODIMENT

Figure 1:
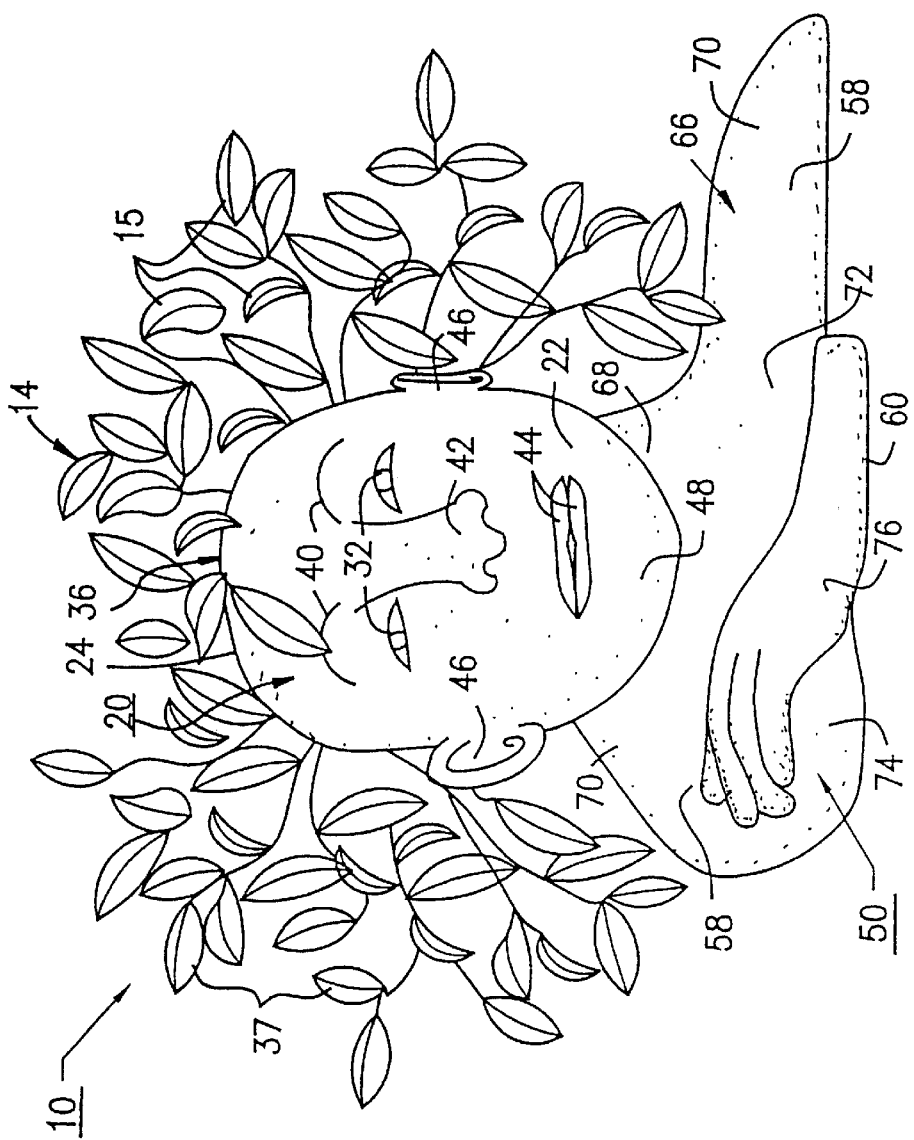
FIG. 1 is a front perspective view of the decorative sculptured-plant vase of the preferred embodiment of the present invention showing the head-vase section connected to the torso-base section in an assembled state and in operational use with a growing plant therein.
Figure 2:
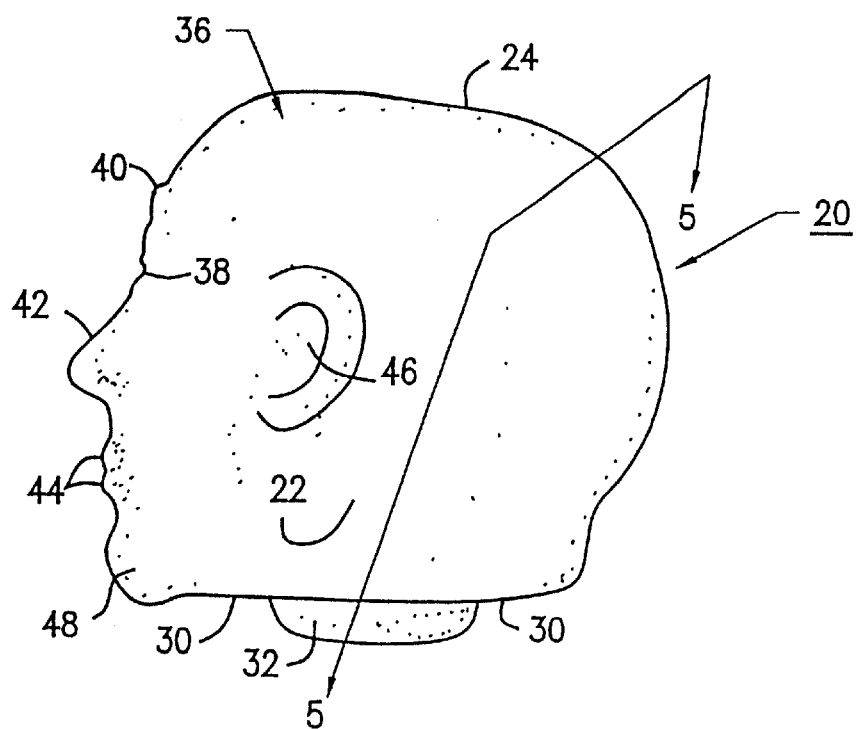
FIG. 2 is a side perspective view of the decorative sculptured-plant vase of the present invention showing the head-vase section having a stabilizing plug member with a drainage hole therein.
Figure 3:
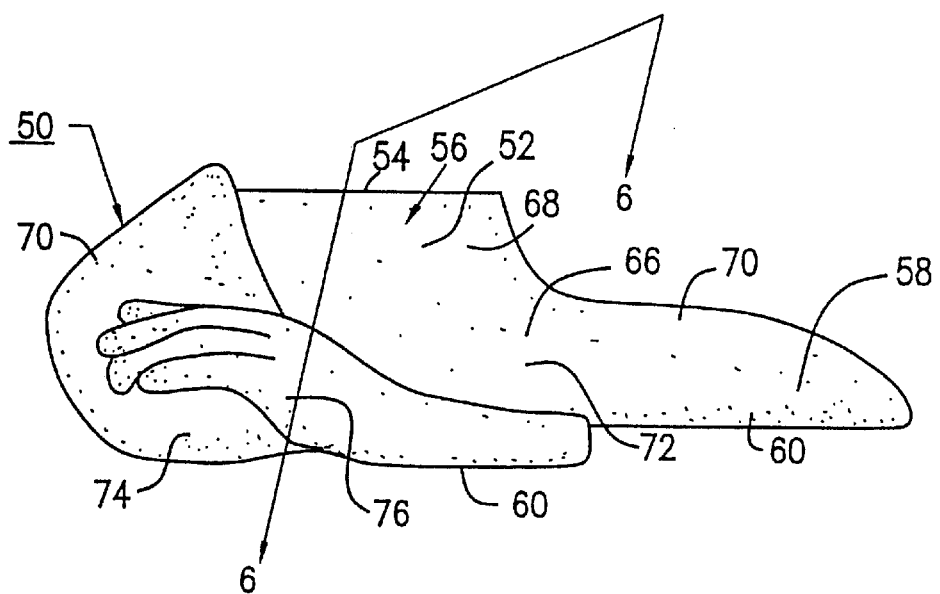
FIG. 3 is a front perspective view of the decorative sculptured-plant vase of the present invention showing the torso-base section having a plug-receiving opening therein.
Figure 4:
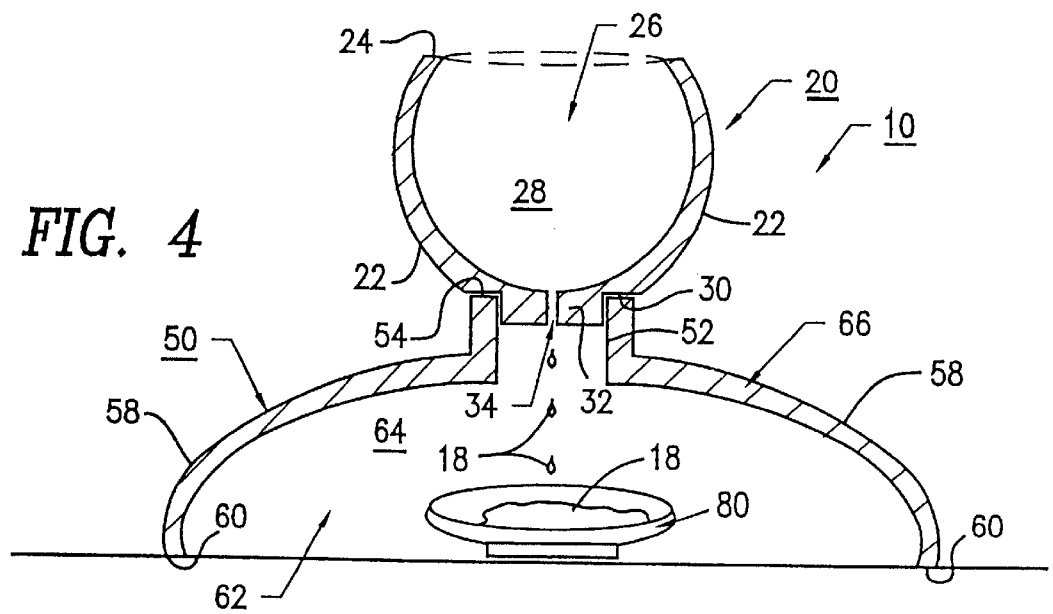
FIG. 4 is a cross-sectional view of the decorative sculptured-plant vase of the present invention taken along lines 4—4 of FIG. 1 showing the head-vase section having the plant receiving opening and the plant interior chamber therein, the stabilizing plug with the drainage hole therein, the torso-base section having the plug-receiving opening therein and the water collection tray for receiving excess water.
Figure 5:
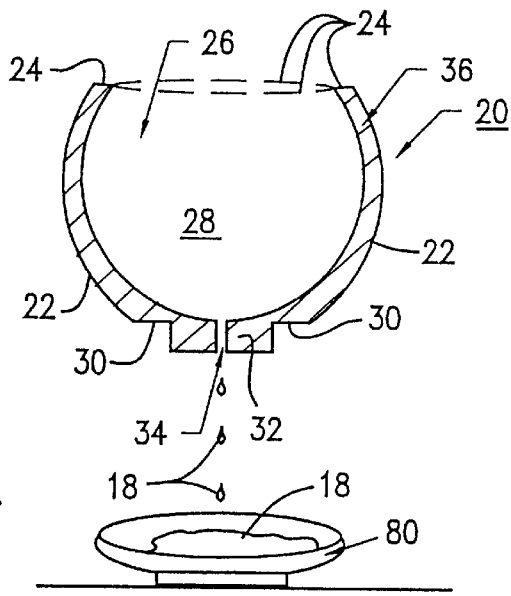
FIG. 5 is a cross-sectional view of the decorative sculptured-plant vase of the present invention taken along lines 5—5 of FIG. 2 showing the head-vase section and the water collection tray.
Figure 6:
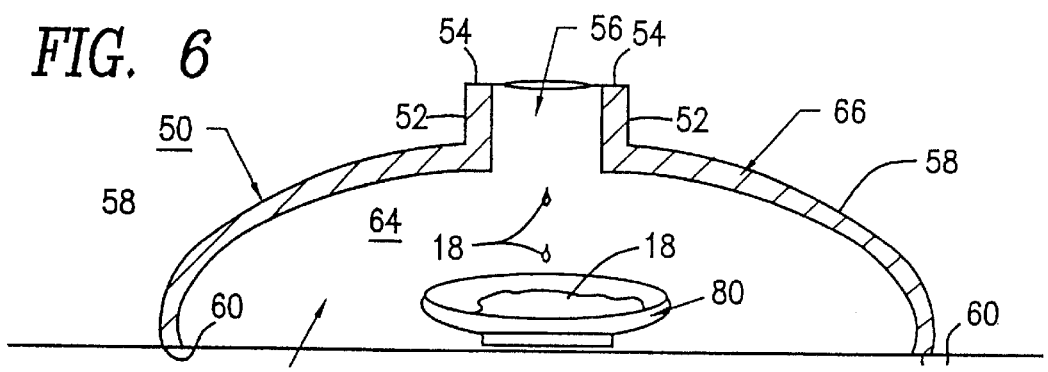
FIG. 6 is a cross-sectional view of the decorative sculptured-plant vase of the present invention taken along lines 6—6 of FIG. 3 showing the torso-base section and the water collection tray.
Figure 7:
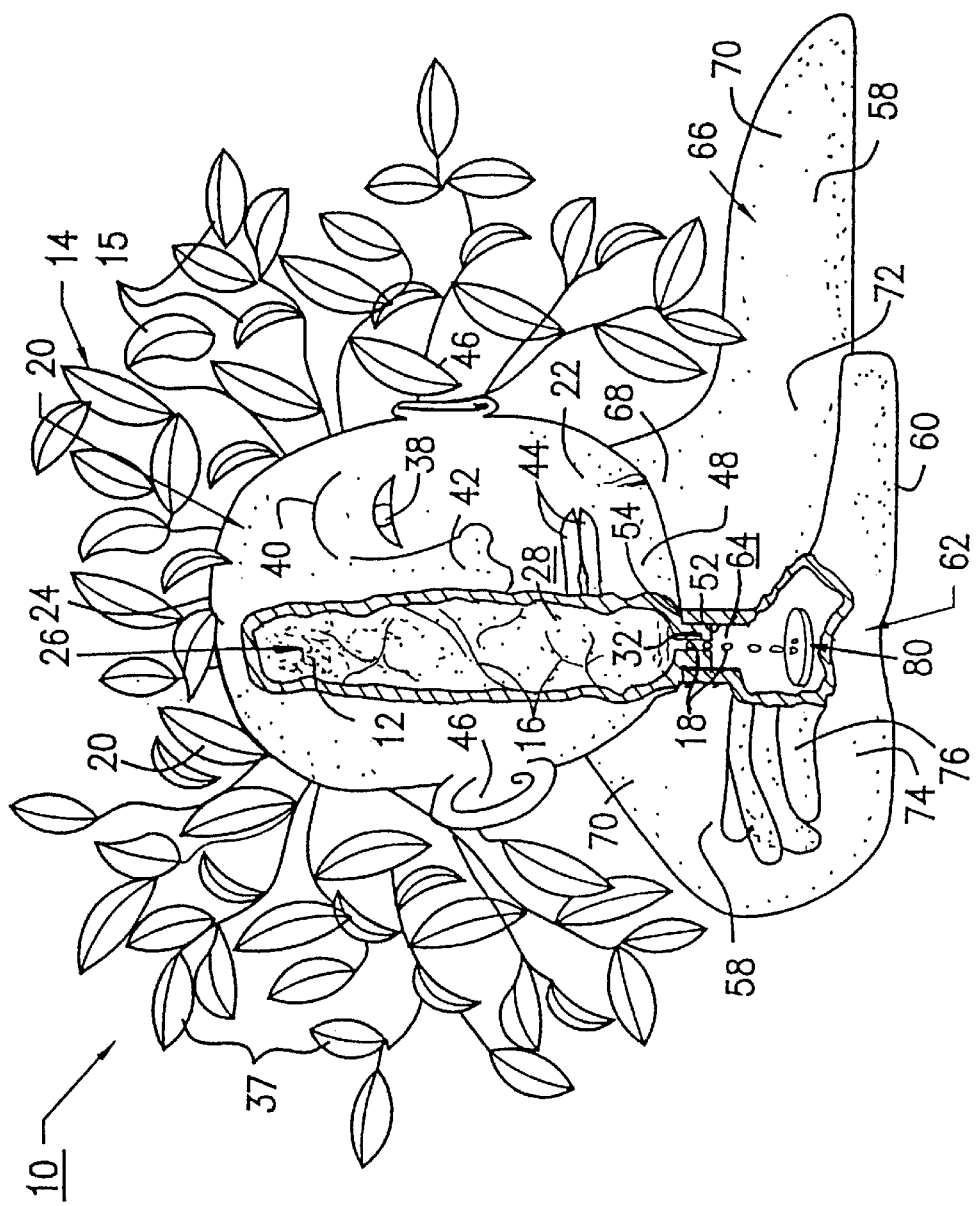
FIG. 7 is a front perspective view of the decorative sculptured-plant vase of the present invention showing all of the component parts thereof broken away and in a fully-assembled condition having a growing plant with plant leaves therein.

The decorative sculptured-plant vase 10 and its component parts of the preferred embodiment of the present invention are represented in detail by FIGS. 1 through 7 of the patent drawings. The sculptured-plant vase 10 is used for holding potting soil 12, a plant 14 having roots 16 and water 18 within a plant interior chamber 28, as shown in FIG. 7 of the drawings. The sculptured-plant vase 10, as shown in FIGS. 1, 4 and 7 of the drawings, includes a head-vase section 20, a torso-base section 50 and a water collection tray 80 for receiving excess water 18. The head-vase section 20 is used for holding the potting soil 12 and the plant 14 with roots 16 therein. The torso-base section 50 is beneath the head-vase section 20, as shown in FIG. 1 of the drawings. The torso-base section 50 is used for enclosing the water collection tray 80 within the torso inner chamber 64 in order to aid in the drainage of excess water 18 from the potting soil 12, plant 14 and roots 16, so the excess water 18 can drain into the water collection tray 80 enclosed in the inner chamber 64 of the torso-base section 50.

The decorative sculptured-plant vase 10 is made from materials selected from the group consisting of terracotta, clay, ceramics, wood, wood products, plastics and formable, light-weight metals. The head-vase and torso-base sections 20 and 50 can be manufactured in a molding operation using any of the aforementioned materials of construction.

The head-vase section 20, as shown in FIGS. 1 and 6 of the drawings, includes a curved outer wall 22, a circular-shaped upper perimeter rim edge 24 for forming a plant receiving opening 26 and a plant interior chamber or compartment 28. Head-vase section 20 also includes a bottom wall 30 having a stabilizing male plug member 32 extending therefrom with at least one drainage hole opening 34 formed therein. The curved outer wall 22 is in the form of a three-dimensional sculptured head 36 of a human having eyes 38, eyebrows 40, a nose 42, lips 44, ears 46 and a chin 48 thereon. The plant 14 and/or flowers have plant leaves 15 in the head-vase section 20 which appear to be the hair 37 of the sculptured head 36, as shown in FIGS. 1 and 7 of the drawings.

The upper head-vase section 20 is in the form and shape of a head 36, where the head sculpture is selected from the group consisting of a human form such as a man, a woman, or a child; an animal form such as a lion, a bird, a wolf or a cat; and a mythical creature such as a unicorn, a gargoyle, a satyr, a flying dragon, an angel, a werewolf, a centaur, or a minotaur.

The torso-base section 50, as shown in FIGS. 1, 3 and 6 of the drawings, includes an upper cylindrically curved wall 52 having a circular perimeter rim edge 54 for forming a plug-receiving opening 56. Torso-base section 50 also includes a substantially curved lower wall 58 having a substantially oval-shaped perimeter rim edge 60 for forming a bottom opening 62 and a torso inner chamber 64 for enclosing the water container tray 80 in alignment with drainage hole opening 34. The curved lower wall 58 is in the form of a three-dimensional sculptured torso 66 of a human having a neck 68, shoulders 70, a chest area 72, a partial arm 74 and a partial hand 76 thereon. The torso-base section 50 could also be a complete torso and include other torso features such as the stomach, legs, and feet, so the sculptured-plant vase 10 may have a total body configuration.

The lower torso-base section 50 is in the form and shape of a torso 66, where the torso sculpture is selected from the group consisting of a human form such as a man, a woman, a child; an animal form such as a lion, a bird, a wolf, or a cat; and a mythical creature such as a unicorn, a gargoyle, a satyr, a flying dragon, an angel, a werewolf, a centaur, or a minotaur.

OPERATION OF THE PRESENT INVENTION

In operation, the sculptured-plant vase 10 of the preferred embodiment is readily put into operational use by initially placing the potting soil 12 and plant 14 within the plant interior chamber 28 of the head-vase section 20. Next, the user places the torso inner chamber 64 of the torso-base section 50 over the water collection tray 80. The user now lifts the head-vase section 20 above the torso-base section 50, such that the stabilizing plug member 32 of the head-vase section 20 is received within the plug-receiving opening 56 of the torso-base section 50, and such that the drainage hole 34 is aligned with the collection tray 80, as shown in FIGS. 5 and 8 of the drawings. This aforementioned step detachably connects together both the head-vase section 20 and the torso-base section 50. In the last step, the user adds water 18 to the potting soil 12 and plant 14 within the plant interior chamber 28. If there is any excess water 18 within interior chamber 28, as shown in FIG. 4 of the drawings, the excess water 18 drains through the drainage hole opening 34 of plug member 32, and this excess water 18 is captured within the collection tray 80, as shown in FIGS. 6 and 7 of the drawings.

ADVANTAGES OF THE PRESENT INVENTION

Accordingly, an advantage of the present invention is that it provides for a decorative sculptured-plant vase that includes a sculptured head-vase section for holding a plant and/or flowers and having a drainage channel therein, and a sculptured torso-base section beneath the sculptured head-vase section for receiving a water collection tray in order to collect drainage water from the drainage channel.

Another advantage of the present invention is that it provides for a decorative sculptured-plant vase having a sculptured head section selected from the group consisting of a human such as a man, a woman or a child; an animal such as a lion, a bird, a wolf, or a cat; and a mythical creature such as a unicorn, a gargoyle, a satyr, a flying dragon, an angel, a werewolf, a centaur, or a minotaur.

Another advantage of the present invention is that it provides for a decorative sculptured-plant vase having a sculptured torso section selected from the group consisting of a human such as a man, a woman or a child; an animal such as a lion, a bird, a wolf, or a cat; and a mythical creature such as a unicorn, a gargoyle, a satyr, a flying dragon, an angel, a werewolf, a centaur, or a minotaur.

Another advantage of the present invention is that it provides for a decorative sculptured-plant vase where the leaves of the plant and/or flowers in the sculptured head-vase section appear to be the hair of the sculptured head.

Another advantage of the present invention is that it provides for a decorative sculptured-plant vase that is made from materials selected from the group consisting of terracotta, clay, ceramic, wood, wood products, plastic or light-weight metal.

Another advantage of the present invention is that it provides for a decorative sculptured-plant vase wherein the sculptured head-vase section and the sculptured torso-base section are manufactured in a molding operation.

A further advantage of the present invention is that it provides for a decorative sculptured-plant vase that can be mass produced in an automated and economical manner and is readily affordable to the consumer.

A latitude of modification, change, and substitution is intended in the foregoing, disclosure, and in some instances, some features of the invention will be employed without a corresponding use of other features. Accordingly, it is appropriate that the appended claims be construed broadly and in a matter consistent with the spirit and scope of the invention herein.

What is claimed is:

1. A three-dimensional, decorative sculptured-plant vase having the appearance of a sculptured head and a sculptured torso for receiving in the sculptured head a plant with leaves, wherein the plant leaves appear to be the hair of the sculptured head, comprising:

a) a head-vase section including a curved outer wall having an upper perimeter rim edge for forming a plant-receiving opening, a plant interior chamber and a bottom wall having a stabilizing plug member extending therefrom; said plug member having at least one drainage hole opening formed therein; and said plant interior chamber for receiving potting soil and a plant(s) therein;

b) a torso-base section including a curved upper wall having an upper perimeter rim edge for forming a plug-receiving opening, a curved lower wall having a substantially curved perimeter rim edge for forming a bottom base opening and a torso inner chamber;

c) said stabilizing plug member of said head-vase section being received within said plug-receiving opening of said torso-base section, wherein said head-vase section is above and detachably connected to said torso-base section;

d) said curved outer wall of said head-vase section having facial features thereon to have the appearance of a three-dimensional sculptured head for receiving a plant with plant leaves in said plant interior chamber of said sculptured head, wherein the plant leaves appear to be the hair of said sculptured head;

e) said curved lower wall of said torso-base section having anatomical features thereon to have the appearance of a three-dimensional sculptured torso; and f) a water collection tray in alignment with said at least one drainage hole opening for receiving excess water drained from said at least one drainage hole opening; said water collection tray being enclosed within said torso inner chamber to render it non-viewable.

2. A decorative sculptured-plant vase in accordance with claim 1, wherein said sculptured head is selected from the group consisting of human form including a man, a woman, or a child; an animal form including a lion, a bird, a wolf, or a cat; and a mythical creature including a unicorn, a gargoyle, a satyr, a flying dragon, an angel, a werewolf, a centaur, or a minotaur.

3. A decorative sculptured-plant vase in accordance with claim 1, wherein said sculptured torso is selected from the group consisting of a human form including a man, a woman, or a child; an animal form including a lion, a bird, a wolf, or a cat; and a mythical creature including a unicorn, a gargoyle, a satyr, a flying dragon, an angel, a werewolf, a centaur, or a minotaur.

4. A decorative sculptured-plant vase in accordance with claim 1, wherein each of said head-vase section and said torso-base section are made from materials selected from the group consisting of terracotta, clay, ceramic, wood, wood products, plastics, formable light-weight metals and combinations thereof.

5. A decorative sculptured-plant vase in accordance with claim 1, wherein each of said head-vase section and said torso-base section are molded in a molding operation.

6. A decorative sculptured-plant vase in accordance with claim 1, wherein said plug member further includes a plurality of drainage hole openings.

7. A decorative sculptured-plant vase in accordance with claim 1, wherein said sculptured torso is a partial anatomical torso.

8. A decorative sculptured-plant vase in accordance with claim 1, wherein said sculptural torso is a full anatomical torso.

* * * * *